US012560510B2

(12) United States Patent
Sun et al.

(10) Patent No.: US 12,560,510 B2
(45) Date of Patent: Feb. 24, 2026

(54) METHODS OF GEOMETRY PARAMETERS MEASUREMENT FOR OPTICAL GRATINGS

(71) Applicant: Applied Materials, Inc., Santa Clara, CA (US)

(72) Inventors: Yangyang Sun, San Jose, CA (US); Jinxin Fu, Fremont, CA (US); Ravi Komanduri, Milpitas, CA (US); Chi-Yuan Yang, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 200 days.

(21) Appl. No.: 18/384,126

(22) Filed: Oct. 26, 2023

(65) Prior Publication Data

US 2024/0142339 A1 May 2, 2024

Related U.S. Application Data

(60) Provisional application No. 63/381,301, filed on Oct. 28, 2022.

(51) Int. Cl.
G01M 11/02 (2006.01)

(52) U.S. Cl.
CPC .............................. G01M 11/0257 (2013.01)

(58) Field of Classification Search
CPC .......................... G01M 11/0257; G01M 11/00
USPC .............................. 356/237.2–237.6, 73, 244
See application file for complete search history.

(56) References Cited

U.S. PATENT DOCUMENTS

2003/0010930 A1  1/2003  Thorwirth
2011/0043791 A1*  2/2011  Smilde ................ G03F 7/70633
                                                            356/128
2019/0072496 A1*  3/2019  Barbu ................ G01N 21/9501
2020/0309598 A1*  10/2020  Fu ......................... G02B 5/1819
2021/0042909 A1  2/2021  Kim et al.
2021/0255552 A1*  8/2021  Venselaar ........... G03F 7/70516
2022/0014163 A1  1/2022  Marek et al.
2022/0214163 A1*  7/2022  Sun .................... G01M 11/0271
2022/0327725 A1*  10/2022  Vaez-Iravani ............ G06T 7/73
2023/0305407 A1*  9/2023  Liu ................... G03F 7/706851

(Continued)

FOREIGN PATENT DOCUMENTS

EP          0462599 A2    12/1991
KR     10-2014-0080111     5/2016

OTHER PUBLICATIONS

International Search Report dated Feb. 22, 2024 for PCT application No. PCT/US2023/036045.

*Primary Examiner* — Isiaka O Akanbi
(74) *Attorney, Agent, or Firm* — Patterson + Sheridan, LLP

(57) ABSTRACT

The present disclosure relates to metrology measurement systems, and related methods. In one or more embodiments a system, includes a substrate support, and an optical arm. The optical arm includes a light source operable to project a first beam on a first light path. The optical arm also includes a first lens, a first beam splitter, a second lens, a first detector, and an aperture. The first lens is disposed on the first light path and between the substrate support and the light source. The first beam splitter is disposed on the first light path. The first beam splitter is positioned between the substrate support and the light source. The first detector is disposed on the second light path. The second lens focuses the second beam to a second beam diameter. The aperture is disposed between the second lens and the first detector.

21 Claims, 7 Drawing Sheets

(56)                    References Cited

U.S. PATENT DOCUMENTS

2023/0314126 A1* 10/2023  Sun .......................... G02B 3/00
                                                        356/138
2024/0142339 A1*  5/2024  Sun .................... G01M 11/0257

* cited by examiner

METHODS OF GEOMETRY PARAMETERS MEASUREMENT FOR OPTICAL GRATINGS

CROSS-REFERENCE TO RELATED APPLICATIONS

This application claims benefit of U.S. Provisional Patent Application No. 63/381,301, filed Oct. 28, 2022, the entirety of which is herein incorporated by reference.

BACKGROUND

Field

Embodiments of the present disclosure relate to measurement systems and methods of measuring attributes of optical devices.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Optical devices are used to assist in overlaying images. Fabricating optical devices can be challenging as optical devices tend to have properties, such as optical device structure pitches and optical device structure orientations that need to be manufactured according to specific tolerances. Conventional systems will experience a decrease in accuracy and repeatability when measuring optical device structures on non-opaque substrates due to reflection and diffraction of light. Accordingly, what is needed in the art are improved devices and methods of measuring attributes of the optical device structures with increased accuracy and repeatability.

SUMMARY

The present disclosure relates to metrology measurement systems, and related methods. In one or more embodiments a system, includes a substrate support, and an optical arm. The optical arm includes a light source operable to project a first beam on a first light path. The optical arm also includes a first lens, a first beam splitter, a second lens, a first detector, and an aperture. The first lens is disposed on the first light path and between the substrate support and the light source. The first beam splitter is disposed on the first light path. The first beam splitter is positioned between the substrate support and the light source. The first detector is disposed on the second light path. The second lens focuses the second beam to a second beam diameter. The aperture is disposed between the second lens and the first detector.

In one or more embodiments a system is provided. The system includes a substrate support, an optical arm, and a detector arm. The optical arm includes a light source, a first plurality of lenses, a first beam splitter, a first detector, and a first aperture. The light source is operable to project a first beam on a first light path. The first plurality of lenses includes a first lens and a second lens. The first lens is disposed on the first light path and is disposed between the substrate support and the light source, the first lens operable to focus the first beam to a beam diameter. The first beam splitter is disposed on the first light path and is positioned on the first light path between the substrate support and the light source. The first beam splitter is operable to allow the first beam projected on the first light path to the substrate support and operable to reflect a second beam on a second light path. The first detector is disposed on the second light path. The second lens of first plurality of lenses the second lens operable to focus the second beam to a second beam diameter. The first aperture disposed on the second light path between the second lens and the first detector. The aperture operable to receive the second beam diameter of the second beam from the second lens. The detector arm includes a second plurality of lenses having a first lens and a second lens, a second aperture disposed between the first lens and second lens of the second plurality of lenses and a sensor. The second aperture is disposed on a reflected light path. The sensor is disposed on the reflected light path.

In one or more embodiments a method is provided. The method, includes rotating a substrate to position a plurality of gratings having an orientation angle perpendicular to a first light path directed to a first zone of the substrate. The first zone has the plurality of gratings disposed therein. The method also includes projecting a first beam at the first zone, the first beam on the first light path passing through a first lens to form a first beam diameter of the first beam at a first grating of the plurality of gratings. The method also includes reflecting the first beam from the first grating to form a second beam on a second light path. The method also includes passing the second beam through a second lens disposed on the second light path, the second lens forming a second beam diameter, passing the second beam through a first aperture disposed on the second light path, the first aperture receiving the second beam diameter of the second beam, passing the second beam through a third lens on the second light path, the third lens disposed after the first aperture. The method also includes forming a first image from second beam with a first detector.

BRIEF DESCRIPTION OF THE DRAWINGS

So that the manner in which the above recited features of the present disclosure can be understood in detail, a more particular description of the disclosure, briefly summarized above, may be had by reference to embodiments. It is to be noted, however, that the drawings illustrate only exemplary embodiments and are therefore not to be considered limiting of its scope, and may admit to other equally effective embodiments.

3

Figure 4:
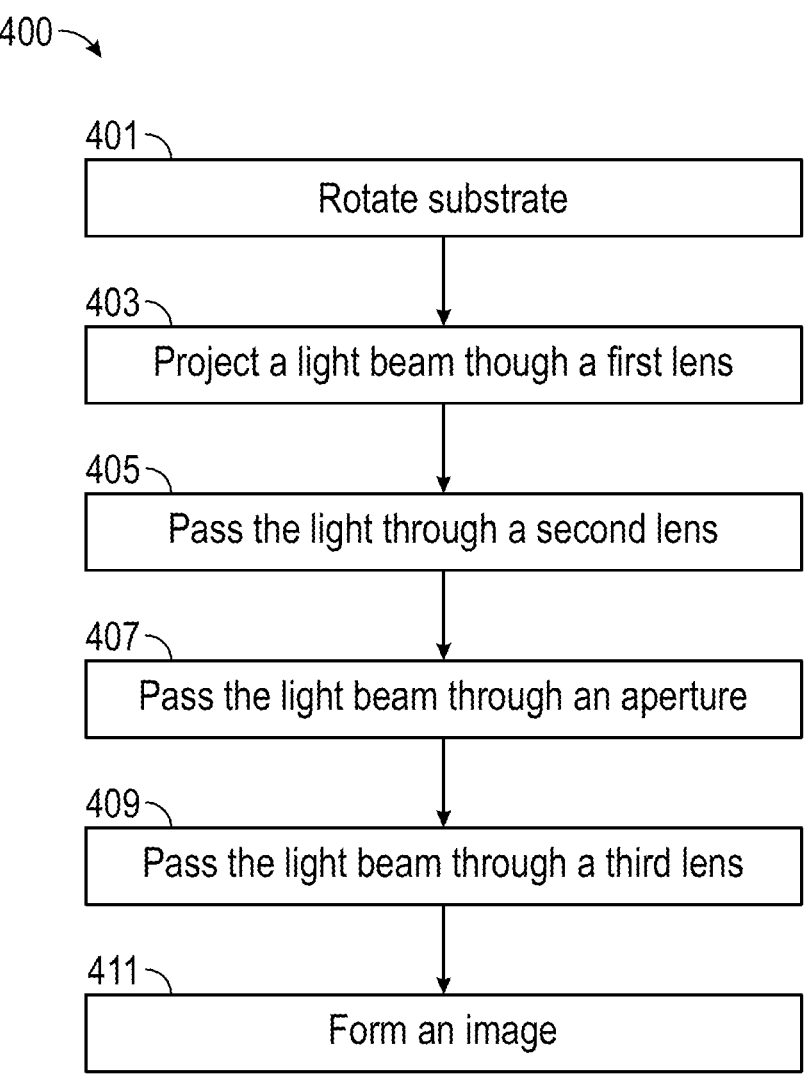

FIG. 4 is a flow diagram of a method for measuring attributes of optical devices, according to some embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to measurement systems for optical devices. More specifically, embodiments described herein provide for metrology measurement systems and methods. A metrology measurement system and methods are shown and described herein.

Figure 2A:
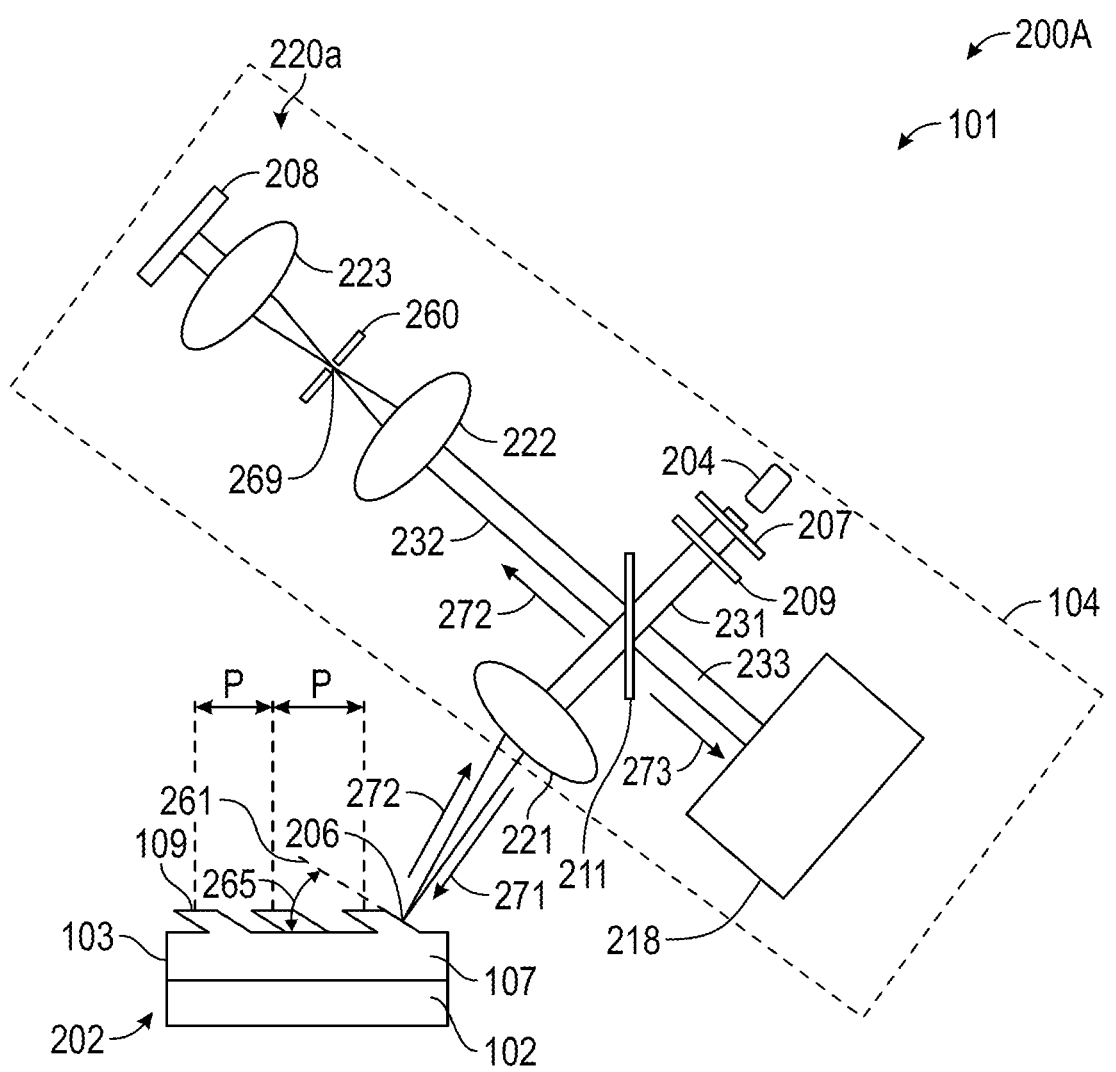
FIGS. 2A-2D are schematic views of configurations of a measurement system, according to some embodiments.

The system enhances the accuracy of information derived from gratings by features of the measurement assembly described herein. Prior grating measurements were not precise due to factors such as non-localized measurements. In other words, prior grating measurements were not able to accurately image a single grating orientation and pitch P (FIG. 2A). Other grating measurement options also required destructive testing. Additionally, grating measurement assemblies utilized designs that lacked rigidity which caused optical noise during operation.

Figure 1:
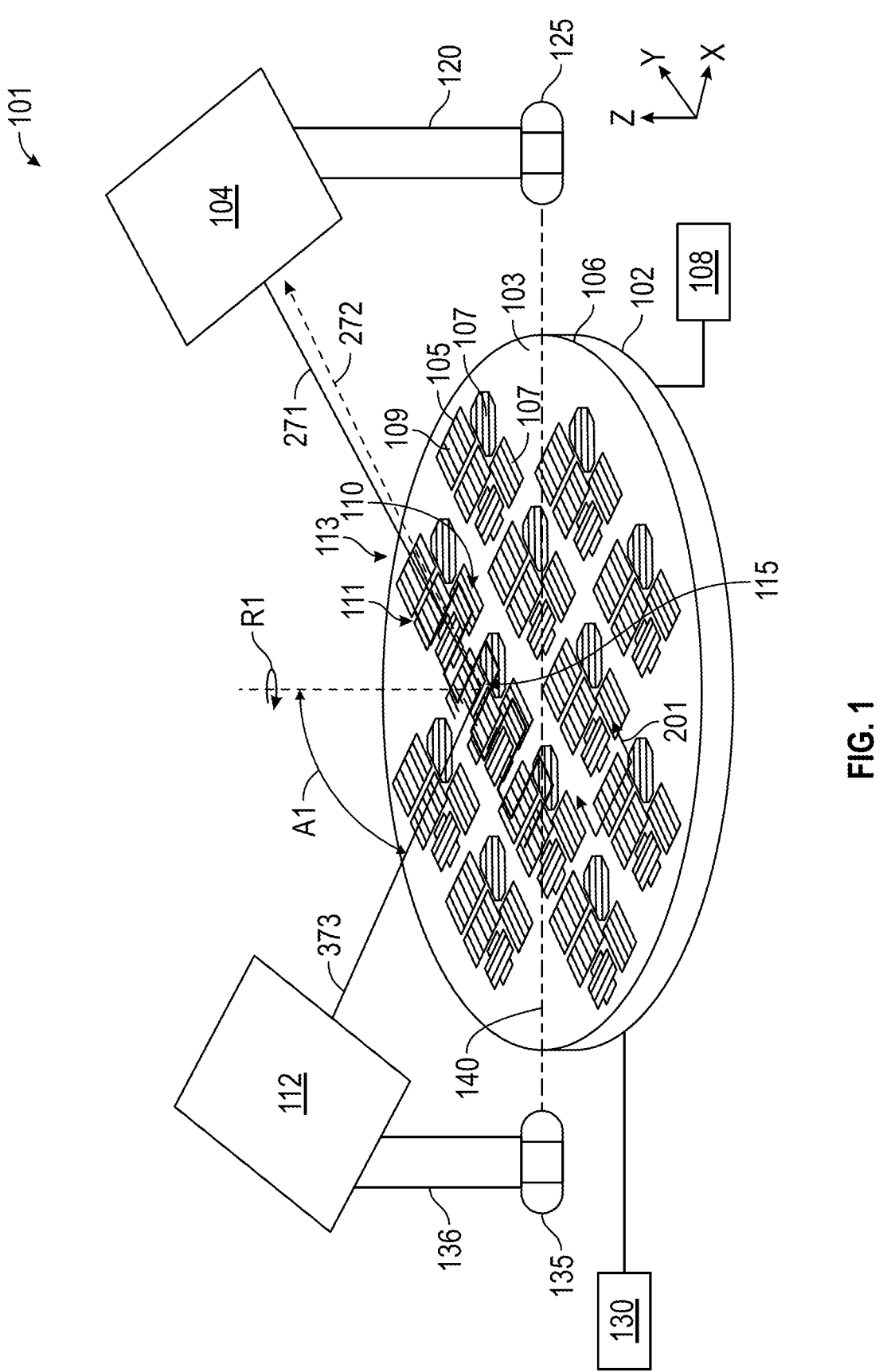
FIG. 1 is a schematic view of a measurement system, according to embodiments.

FIG. 1 is a schematic view of a measurement system 101. As shown, the measurement system 101 includes a substrate support 102, an optical arm 104, and a detector arm 112. The measurement system 101 is configured to diffract light projected by the optical arm 104. The light projected by the optical arm 104 is directed at a substrate 103 disposed over the substrate support 102. The light that is reflected and diffracted from the substrate 103 is incident on the optical arm 104 and reflected to the detector arm 112 and. In one embodiment, which can be combined with other embodiments described herein, the measurement system 101 includes the optical arm 104 and the detector arm 112. In another embodiment, which can be combined with other embodiments described herein, the measurement system 101 includes only the optical arm 104.

As shown, the substrate support 102 includes a support surface 106 and a support actuator 108. The substrate support 102 is configured to retain the substrate 103 on the support surface 106. The substrate support 102 is coupled to the support actuator 108. The support actuator 108 is configured to move the substrate support 102 in a scanning path 110 along an x-direction and a y-direction, and rotate the substrate support 102 about a z-axis, about the axis R1. The substrate support 102 is configured to move and rotate the substrate 103 such that light projected from the optical arm 104 is incident on different portions or gratings of the substrate 103 during operation of the measurement system 101.

The substrate 103 includes one or more optical devices 105 having one or more gratings 107 of optical device structures 109. Each of the gratings 107 includes regions of optical device structures 109. For example, a grating 107 maybe in a first zone 115. The optical device structures 109 have an orientation angle 265 (FIG. 2A) and a pitch P (FIG. 2A).

The pitch P is defined as a distance between adjacent points, such as adjacent first edges or adjacent center of masses of the optical device structures 109. The pitch P and the orientation angle 265 of the optical device structures 109 for a first grating 111 can be different than the pitch P and the orientation angle 265 of the optical device structures 109 for a second grating 113 of the one or more gratings 107. In addition, there can be local pitch P variations and local orientation angle 265 variations of the optical devices structures 109 due to local warping or other deformation of the substrate 103. The measurement system 101 can be utilized to measure the pitch P and the orientation angle 265 of the optical device structures 109 for each of the gratings 107 of each of the optical devices 105. The substrate 103 can be a single crystal wafer of any size, such as having a radius from about 150 mm to about 450 mm.

The optical arm 104, the detector arm 112, and the substrate support 102 are coupled to a controller 130. The controller 130 facilitates the control and automation of the method 400 for measuring the pitch P and the orientation angle 265 of gratings 107 of optical device structures 109 described herein. The controller may include a central processing unit (CPU) (not shown), memory (not shown), and support circuits (or I/O) (not shown). The CPU may be one of any form of computer processors that are used in industrial settings for controlling various processes and hardware (e.g., motors and other hardware) and monitor the processes (e.g., transfer device position and scan time). The memory (not shown) is connected to the CPU, and may be a readily available memory, such as random access memory (RAM). Software instructions and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like. A program (or computer instructions) readable by the controller determines which tasks are performable on the substrate 103. The program may be software readable by the controller and may include code to monitor and control, for example, substrate position and optical arm position.

The optical arm 104 is coupled to a first arm actuator 125. The first arm actuator 125 is configured to rotate the optical arm 104 around the substrate support 102. The optical arm 104 is coupled to the first arm actuator 125 by an optical arm bar 120. The first arm actuator 125 rotates the optical arm 104 around an arm axis 140 over and around the substrate support 102. The arm axis 140 is aligned with the substrate support surface 106 according to some embodiments.

The detector arm 112 is coupled to a second arm actuator 135. The second arm actuator 135 is configured to rotate the detector arm 112 around the substrate support 102. The detector arm 112 is coupled to the second arm actuator 135 by a detector arm bar 136. In some embodiments, the second arm actuator 135 rotates the detector arm 112 around the arm axis 140 over and around the substrate support 102. The arm axis 140 aligns the first arm actuator 125, the second arm actuator 135, and the substrate support surface 106 in the same plane, according to some embodiments.

FIGS. 2A-2D are schematic views of configurations 200A-200D of a measurement system 101. In embodiments where the substrate 103 is non-opaque, which can be combined with other embodiments described herein, reflections and diffractions of light from multiple surfaces of the substrate 103 will cause interference on the optical arm 104 and the detector arm 112. The interference is non-symmetric i.e., the image of the light path diffracted or reflected off the substrate 103 is not circular or substantially circular when reflected into sensors in the optical arm 104. The sensors receive the image of the light path diffracted or reflected off the substrate 103 on sensors of the optical arm 104 and the detector arm 112 as further described below. To address this, the measurement system 101 utilizes one or more of a first beam splitter 211*a* a second beam splitter 211*b*, a first plurality of lenses 220*a*, a second plurality of lenses 220*b*, a first aperture 260, a tilted aperture 263, and a second aperture 360. Multiple images are combined to generate a symmetric beam i.e., a circular beam. The centroid of the beam is determined with image processing algorithms. The image processing algorithms may be at least partially executed by a controller 130. The optical arm 104 is in communication with the controller 130. The optical arm 104 can include an arm actuator 203. The arm actuator 203 is configured to rotate the optical arm 104 about the z-axis and scan the optical arm in a z-direction. The optical arm 104 can be fixed while the measurement is performed.

Figure 3:
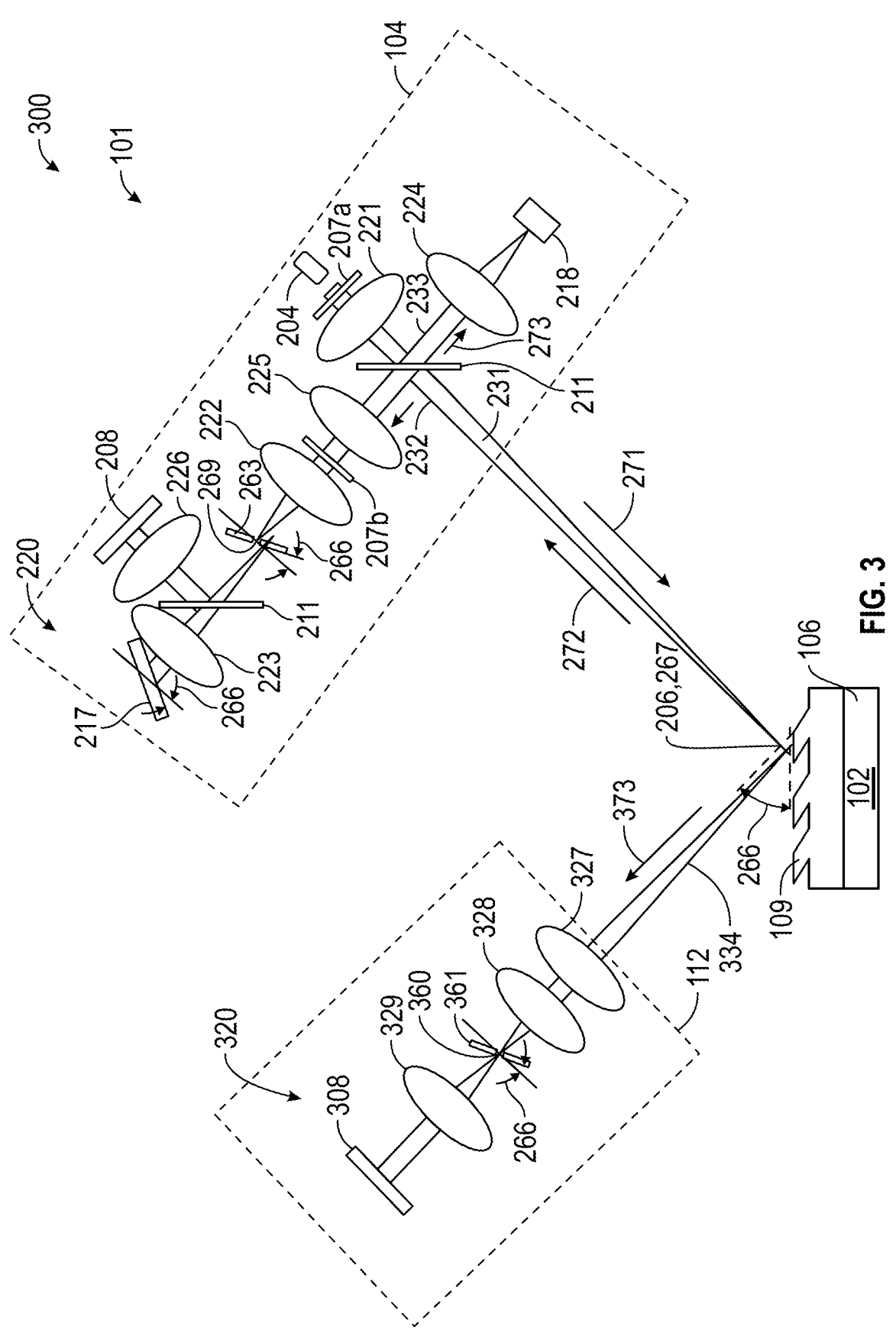
FIG. 3 is a schematic view of a configuration of a measurement system, according to some embodiments.

The controller is operable and configured to communicate with at least one or more of a first detector 208, a second detector 218, a third detector 217, and a sensor 308 (FIG. 3). The controller 130 is able to image light and determine one or more grating attributes based on information received from the first light path 231, second light path 232, third light path 233, and reflected light path 334. The grating attributes include one or more of a grating pitch, a grating orientation, issues caused by non-uniformity of the substrate support surface 106, and light intensity from the light source 204, and/or the reflection from the gratings 107. The controller 130 is able to perform the method 400. The method 400 is stored on the memory of the controller. The CPU of the controller 130 is capable of having the CPU send instructions to the measurement system 101 to perform the method 400.

FIG. 2A is a schematic view of a configuration 200A of a measurement system 101. The configuration 200A includes a portion 202 of a section line 201 (shown in FIG. 1) across a substrate 103. The substrate 103 has the one or more gratings 107 of optical device structures 109. As shown, the optical arm 104 has a light source 204, a first plurality of lenses 220*a*, a first beam splitter 211, a first aperture 260, a first detector 208, and a second detector 218.

The light source 204 projects a first beam 271 on a first light path 231. The first beam 271 travels on the first light path through the first reticle 207 and the polarizer 209. The light source 204 is operable to project a collimated beam of light.

The first plurality of lenses 220*a* includes a first lens 221, a second lens 222, and a third lens 223. The first lens 221 is on the first light path 231. The first lens 221 is between the light source 204 and substrate support 102. The first lens 221 focuses the first beam 271 to a first beam diameter 206. The first beam diameter 206 is disposed on an angled face 261 of the grating 107. The angled face 261 is disposed at an orientation angle 265. In one embodiment, which can be combined with other embodiments described herein, the first light path 231 has a circular or substantially circular cross-section. The first lens 221 is on the first light path 231 after the first beam splitter 211.

The first lens 221 is operable to focus the first beam 271 to the first beam diameter 206. The first beam diameter 206 is between about 1 micrometer and about 15 micrometers, for example about 10 micrometers. The first beam diameter 206 is the focal point of the first lens 221. The first beam diameter 206 is directed to the angled face 261 of the grating 107. The first beam 271 is focused when it passes through the first lens 221. Focusing the first beam 271 makes the point of measurement the first beam diameter 206.

The first beam 271 is reflected from the angled face 261 of the grating 107 to form a second beam 272 on a second light path 232. The first light path 231 is incident on the substrate 103 and reflects a second light path 232 back to the optical arm 104. In one embodiment, which can be combined with other embodiments described herein, the second light path 232 is a first order diffraction. The first beam 271 is a light beam before being reflected from the substrate 103. The second beam 272 is the beam reflected from the substrate 103. A portion of the first light path 231 becomes the second light path 232 after the reflection from the substrate 103. The second beam 272 is the light reflected from the substrate.

The first beam splitter 211 is disposed on the first light path 231. The first beam splitter 211 is positioned between the substrate support 102 and the light source 204 on the first light path 231. The light beams described herein can be laser beams. The light source 204 is operable to project light at a beam angle A1 (shown in FIG. 1) along the first light path 231 to the substrate 103, according to one embodiment.

The first beam splitter 211 is operable to allow the first beam 271 on the first light path 231 directed to the substrate support to deflect the second beam 272 on the second light path 232 from by the substrate 103 to the first detector 208.

The first beam splitter 211 forms a third light path 233 from the first light path 231. The first beam splitter 211 is operable to deflect the second beam 272 on the second light path 232 from by the substrate 103 to the first detector 208.

The first detector 208 is disposed on the second light path 232. A first image of the second light path 232 is projected on the first detector 208. The first detector 208 is any optical apparatus used in the art to detect light, such as a CCD array or a CMOS array.

The second lens 222 is operable to focus the second beam 272 to a second beam diameter 269. The second beam diameter 269 is near the focal point of the second lens 222. The first aperture 260 may be disposed where the second beam 272 becomes the second beam diameter 269. For example, the first aperture 260 is disposed at the focal point of the second lens 222. In one or more embodiments, the first aperture 260 is disposed between the focal point of the second lens 222 and the second lens 222. In some embodiments, the first aperture 260 is disposed between the second beam diameter 269 and the second lens 222. The first aperture 260 includes a mechanism to adjust the first aperture 260 to maximize the effectiveness of the first aperture 260. For example, the first aperture 260 is adjusted closer to or farther away from the second lens 222. For example, the first aperture 260 is adjusted by angling the first aperture 260 from the major axis of the second beam 272. The first aperture 260 has a diameter of from about 1 micro meter to about 50 micro meters. For example, the first aperture 260 has a diameter of from about 5 micrometers to about 20 micrometers, for example, about 15 micrometers.

The first aperture 260 is disposed on the second light path 232 between the first beam splitter 211 and the first detector 208. The first aperture 260 is operable to rotate the second image at any angle. The first aperture 260 is operable reduce noise caused by at least one or more lenses of the first plurality of lenses 220*a* and/or reflections from surfaces that are not the angled face 261. Prior to contacting the first detector 208, the second light path 232 passes through the first aperture 260. The first aperture 260 rotates the image of the second light path 232 on the first detector 208.

The third lens 223 is between the first aperture 260 and the first detector 208 on the second light path 232. Therefore, an image of the second light path 232 is projected on the first detector 208 after passing through the third lens 223. The third lens 223 collimates the second beam 272 after the second beam 272 passes through the first aperture 260. By collimating the second beam 272, the first detector 208 can image and analyze the light for changes in at least pitch P and/or orientation of the gratings 107.

The configuration of the second lens 222, first aperture 260, and third lens 223 enables the first detector 208 to receive filtered light. The filtered light is the light reflected from the angled face 261 of the gratings 107 and has less noise from light reflected from other surfaces of the substrate 103 and gratings 107.

In one or more embodiments which may be combined with other embodiments, the optical arm 104 may also include a first reticle 207, and a polarizer 209.

In one or more embodiments, the first reticle 207 is on the first light path 231. The first reticle 207 adds a marker to an image of the first beam 271. In one or more embodiments, the polarizer 209 is disposed on first light path 231. The polarizer 209 polarizes the first beam 271.

In one or more embodiments, the first beam splitter 211 reflects a portion of the first beam 271 and/or a portion of the second beam 272 to a third light path 233. The third light path 233 directs light towards a second detector 218. The second detector 218 is a sensor, for example an integrating sphere. The second detector 218 enhances the efficiency measurements of the gratings 107. The second detector 218 may measure the rate of change in height of the gratings. The second detector 218 may measure the strength and or intensity of the reflection from the gratings 107. The second detector 218 may measure the intensity of the light from the light source 204 to account for variations from the light source 204.

The first lens 221 enhances the resolution of data acquired from the light. The first lens 221 focuses the first beam 271 to a diameter smaller than the gratings 107. Focusing the first beam 271 to a diameter smaller than the gratings 107 enables each grating 107 to be analyzed for at least pitch P and orientation. Focusing the first beam 271 with first lens 221 enhances spatial resolution by minimizing the surface area of the first beam 271 to a size smaller than the angled face 261 of the gratings 107.

The first aperture 260 operates to reduce the second beam 272 to mostly light reflected from angled face 261. The first aperture 260 minimizes the amount of light received by the first detector 208 from light not reflected from the angled face 261 of the gratings 107. Noise from light reflected from other surfaces can cause inaccurate readings. The first aperture 260 operates to filter the noise from the light reflected from the gratings 107 before the light is received by the first sensor.

By having the first aperture 260 perpendicular to the second beam 272, the first detector 208 can detect any changes in grating orientation. This configuration enables the first detector 208 to form a first image. The first image is used to detect changes in grating orientation and pitch P. To ensure accurate information is received, the position of the aperture in relation to the second lens 222 and/or third lens 223 can be adjusted to ensure the light received by the first detector is in focus. The first aperture 260 operates as a conjugate plain so that the first detector 208 has better lateral resolution. The first aperture 260 also operates to enhance resolution in the direction perpendicular to the substrate 103 and support surface 106.

The gratings 107 have a pitch P. The pitch P is determined from distances between the gratings 107. The gratings 109 have a duty cycle determined by dividing the linewidth of each grating by the pitch P.

Figure 2B:
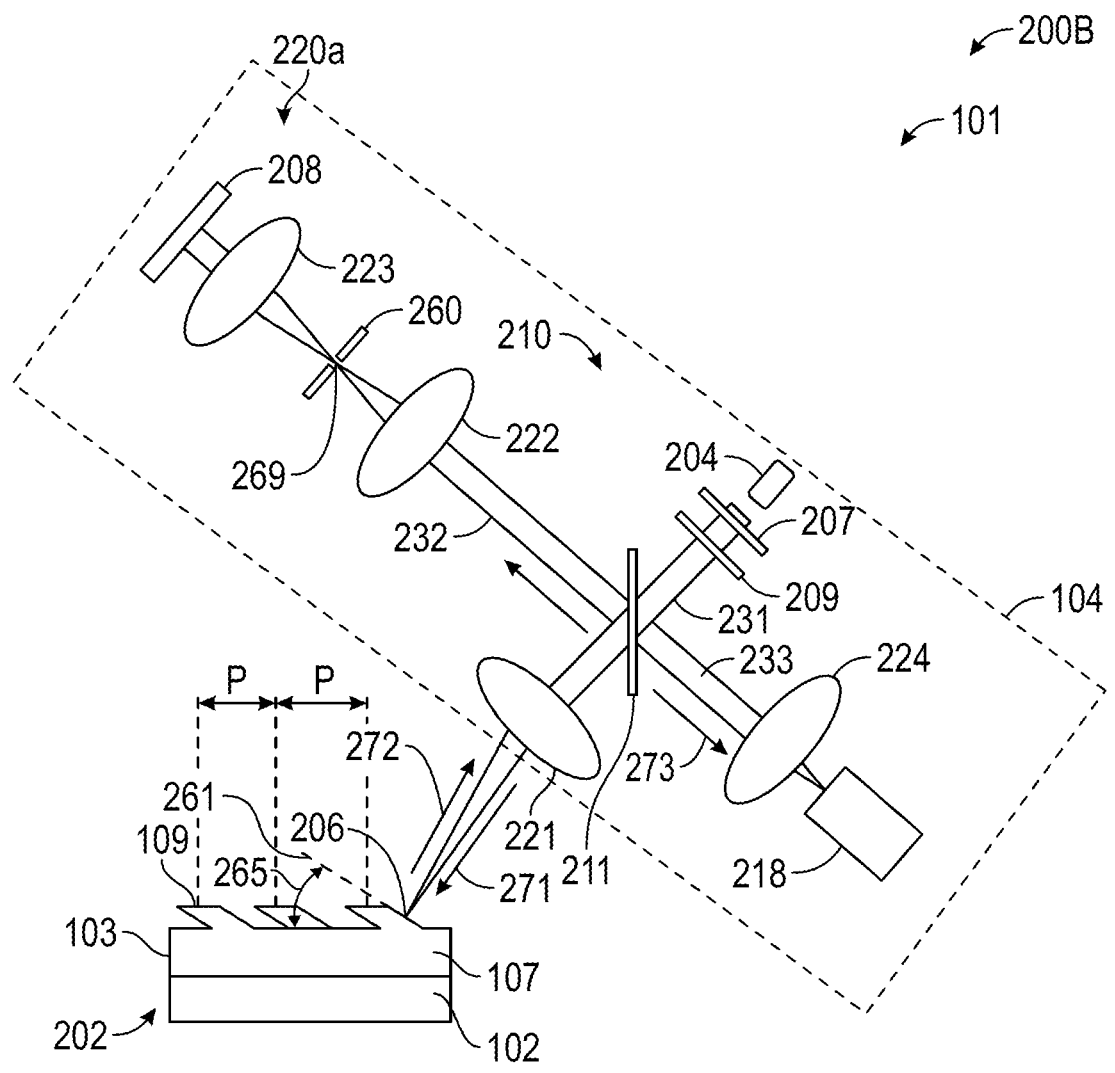

FIG. 2B is a schematic view of a configuration 200B of a measurement system 101. As shown, the optical arm 104 has the light source 204, the first plurality of lenses 220a, the first beam splitter 211, the first aperture 260, the first detector 208, the second detector 218, the first reticle 207, and the polarizer 209.

The implementation shown in FIG. 2B includes a fourth lens 224 of the first plurality of lenses 220a. In some embodiments the fourth lens 224 is disposed between the first beam splitter 311 and the second detector 218. The fourth lens 224 focuses the third beam 273 to the second detector 218.

The fourth lens 224 is disposed on the third light path 233. The fourth lens 224 is disposed between the first beam splitter 211 and the second detector 218. The fourth lens 224 focuses light to the second detector 218. By having the second detector 218 receive focused light, the second detector 218 can use the image in the light as a reference to improve resolution and analyses non-collimated light. By analyzing the focused light, the second detector may provide a reference for light at the second beam diameter 269 in the first aperture 260.

Figure 2C:
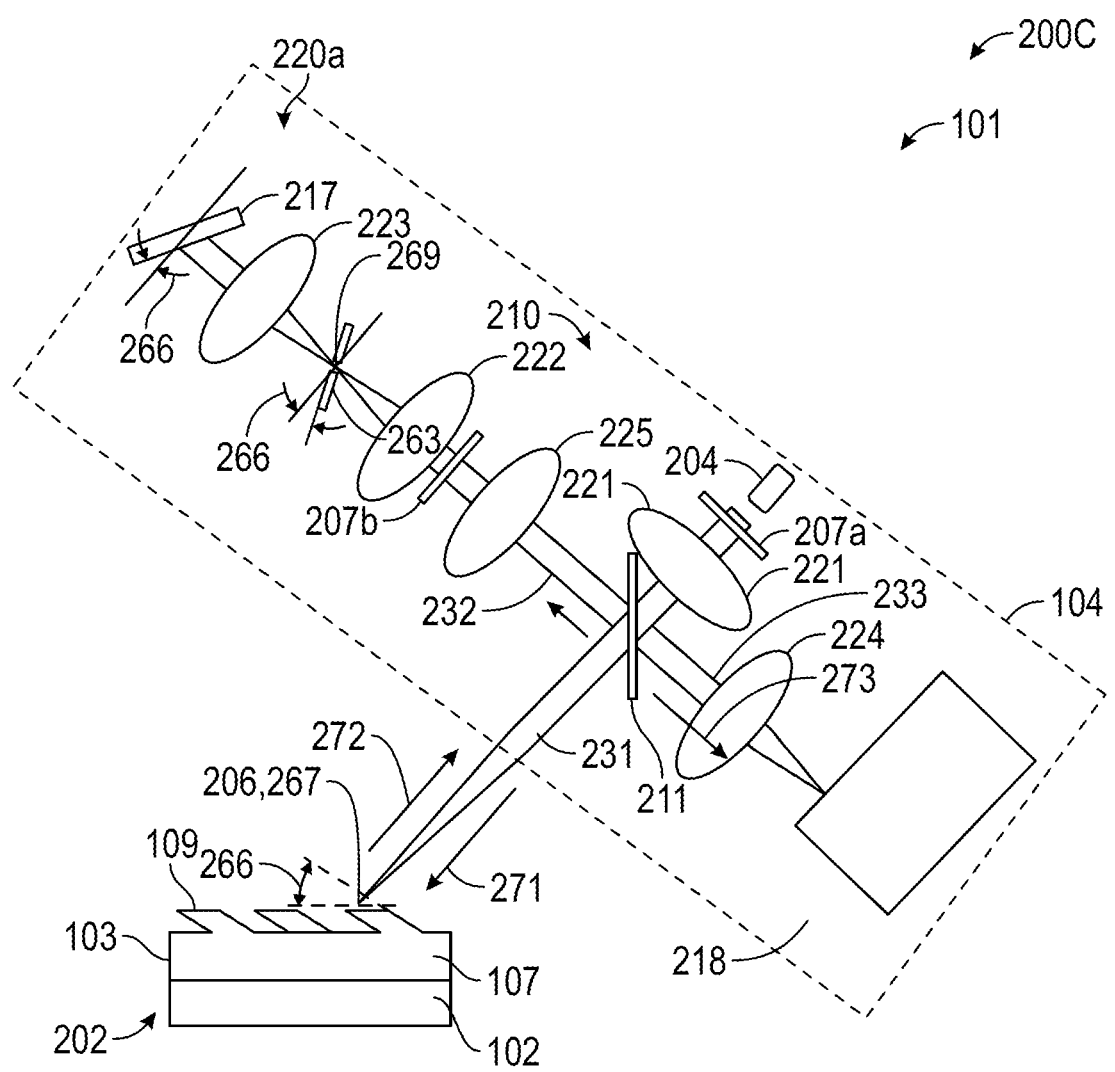

FIG. 2C is a schematic view of a configuration 200C of a measurement system 101. As shown, the optical arm 104 has the light source 204, the first plurality of lenses 220a, the first beam splitter 211, the first detector 208, and the second detector 218. The implementation shown in FIG. 2C also includes a tilted aperture 263 and a fifth lens 225 of the first plurality of lenses 220a.

As shown, the first beam diameter 206 is directed to the top face 267. In some embodiments, the top face 267 is angled a tilt angle 266 from the angled face 261 (FIG. 2B) of the grating 107. In some embodiments, the top face 267 may also be angled a tilt angle 266 from the perpendicular plane formed by the first beam 271.

The titled aperture 263 is disposed between the second lens 222 and the third lens 223. The titled aperture 263 is disposed on the second light path 232, after the second lens 222 and after the first beam splitter 211. When the first lens 221 is focuses on a top face 267 of the grating 107, the first beam 271 is not perpendicular to the top face 267. The first beam 271 is projected at the top face 267 at a tilt angle 266.

The tilted aperture 263 is angled at the tilt angle 266. Angling the titled aperture 263 enables the first detector 208 to analyze reflected light when the first beam 271 is not perpendicular to the surface being measured.

The implementation shown in FIG. 2C also moves the first lens 221. The first lens 221 is disposed between the light source 204 and the first beam splitter 211. Moving the first lens 221 before the first beam splitter 211 enhances a ratio of filtered light to noise received by the first detector 208.

The fifth lens 225 is disposed between the first beam splitter 211 and the second lens 222. The fifth lens is on the second light path 232. The fifth lens 225 receives and collimates the second beam 272.

The implementation shown in FIG. 2C may also include a first reticle 207a, and a second reticle 207b. The first reticle 207a, and the second reticle 207b enhance the measuring capabilities of the measurement system 101.

Figure 2D:
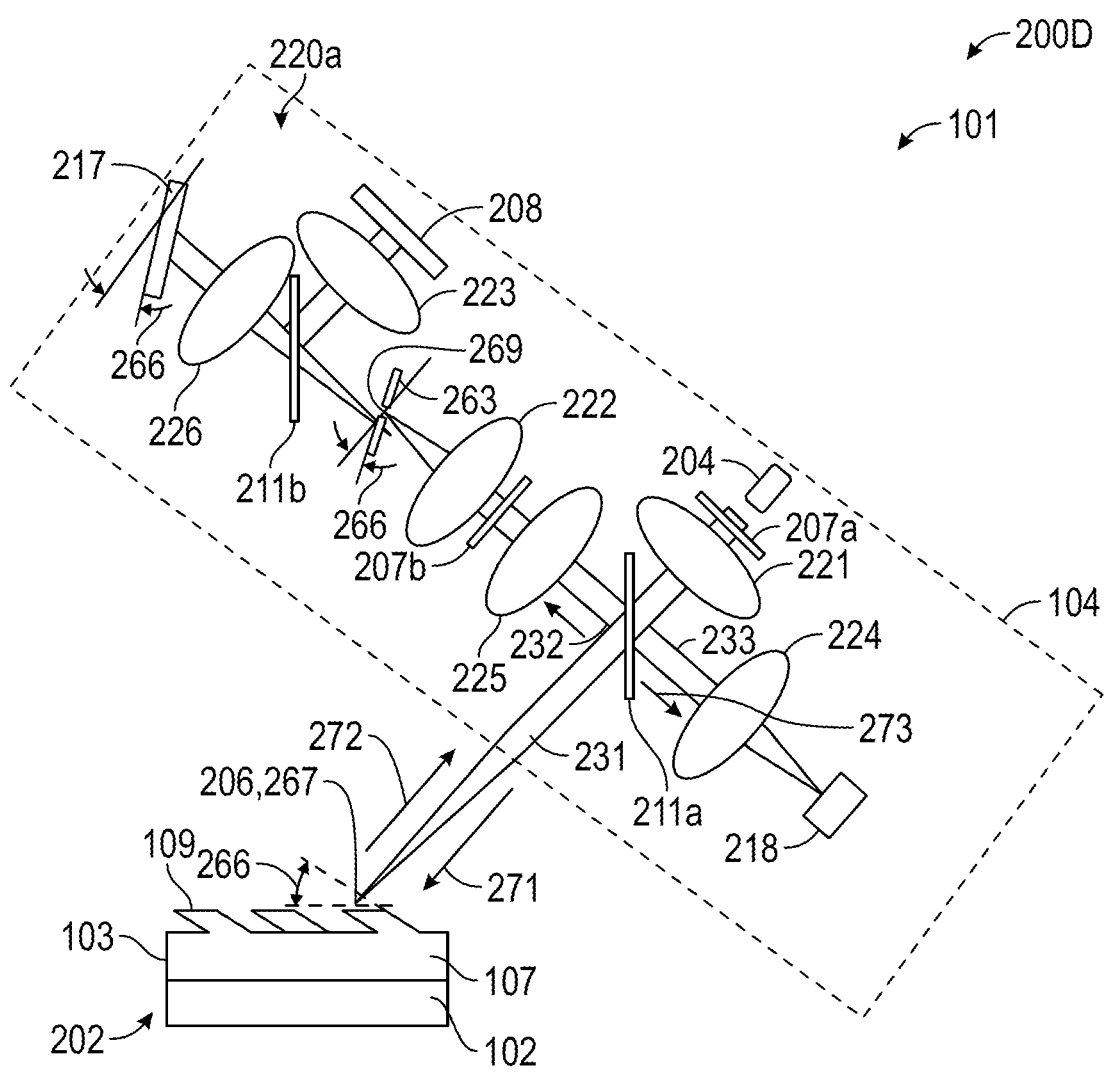

FIG. 2D is a schematic view of a configuration 200D of a measurement system 101. As shown, the optical arm 104 includes the light source 204, the first plurality of lenses 220a, the first detector 208, and the second detector 218. The implementation shown in FIG. 2D also includes the tilted aperture 263, a third detector 217, a first beam splitter 211a, a second beam splitter 211b, and a sixth lens 226 of the first plurality of lenses 220a.

The second beam splitter 211b is disposed after the titled aperture 263 on the second light path 232. The second beam splitter 211*b* directs a portion of the second beam 272 to the first detector 208 and directs a portion of the second beam 272 to the third detector 217. The third lens 223 is disposed between the first detector 208 and the second beam splitter 211*b* on the second light path 232.

The sixth lens 226 of the first plurality of lenses 220*a* is disposed between the third detector 217 and the second beam splitter 211*b* on the second light path 232. The sixth lens 226 ensures the light is fully collected by the third detector 217. In one or more embodiments, the sixth lens 226 is a lower power lens so that the third detector 217 can receive the light from tilted aperture 263 when the third detector 217 is disposed farther from the tilted aperture 263.

In one or more embodiments, the third detector 217 is disposed at the tilt angle 266. In other embodiments, the third detector 217 is disposed at another angle to enhance image quality or focus. In other embodiments, the third detector 217 is disposed perpendicular to the second beam 272. Implementing a third detector 217 enables simultaneous imaging of the surface of the substrate 103 and the top face 267 of the grating 107. The concurrent analysis enables enhanced alignment of the system, and monitors changes in focus during measurement operations.

FIG. 3 is a schematic view of a configuration 300 of a measurement system 101. As shown, the optical arm 104 includes the configuration of FIG. 2D with the detector arm 112.

The detector arm 112 includes a second plurality of lenses 320. The second plurality of lenses 320 includes a first lens 327, second lens 328, and a third lens 329.

The detector arm 112 includes a second aperture 360. The second aperture 360 is disposed between the first lens 327 and the second lens 328 of the second plurality of lenses 320. The second aperture 360 is disposed on a reflected light path 334.

The detector arm 112 includes a sensor 308. The sensor 308 is disposed on the reflected light path 334.

The arrangement of the second aperture 360 between the second lens 328 and third lens 329 of the second plurality of lenses 320 is operable to filter out optical noise before the third beam 373 reaches the sensor 308. In some embodiments, the second aperture 360 is disposed perpendicular to the third beam 373. In other embodiments, the second aperture 360 is disposed at an angle to the third beam 373.

In some embodiments, the third beam 373 is light parallel to the grating 107 orientation. In other embodiments, the third beam 373 is light angled from a surface of the grating 107. The sensor 308 reads and images the third beam 373 to enable the measurement system 101 to determine attributes about any non-uniformity of the support surface 106 of substrate support 102. Knowing if an issue is caused by the support surface 106 or the gratings 107 enhances the efficiency of the measurement system 101.

The third beam 373 travels on the reflected light path 334 toward the detector arm 112 to the sensor 308. The detector arm 112 enables analysis of the substrate support 102. The detector arm 122, is used to measure deflection of a third beam 373. The third beam 373 is light reflected from the gratings 107. For example, the third beam 373 is light reflected from one or more of angled face 261 of the grating 107, the top face 267 of the grating 107, the support surface 106 of the substrate support 102, the surfaces of the substrate 103, or any combination thereof.

FIG. 4 is a flow diagram of a method for measuring attributes of optical device structures 109, according to some embodiments. At operation 401 the substrate 103 is rotated to position a plurality of gratings 107 of the optical device structures 109. The gratings 107 have an orientation angle 265 and a pitch P (FIG. 2A). The substrate 103 is rotated to a desired position. For example, the substrate 103 is rotated such that the orientation angle 265 is about perpendicular to a light beam. In some embodiments, the light beam is at an angle from orientation angle 265 of the gratings 107. In some embodiments, the light beam is the first beam 271. The first beam 271 is directed to a first zone 115 of the substrate. The first zone 115 includes the plurality of gratings 107 disposed therein.

At operation 403 a first beam 271 is projected at the first zone 115. The first beam 271 is on the first light path 231. The first beam 271 passes through a first lens 221 to form a first beam diameter 206 of the first beam 271. The first beam diameter 206 of the first beam 271 is directed at a first grating 111 (FIG. 1) of the plurality of gratings 107.

The first beam 271 is reflected from a first grating of the gratings 107. The reflected beam forms a second beam 272. The second beam 272 is on a second light path 232.

The light source 204 creates the first beam 271 and begins the first light path 231. The first beam 271 is focused by the first lens 221. The first lens 221 may be before or after a first beam splitter 211 on the first light path 231. In one or more embodiments, the first beam 271 travels to the first beam splitter 211 and a portion of the first beam 271 becomes a third beam 273. The third beam is directed to the second detector 218 on a third light path 233. In one or more embodiments, the second beam 272 travels to the first beam splitter 211 and a portion of the second beam 272 becomes a third beam 273. The third beam is directed to the second detector 218 on a third light path 233.

At operation 405, the second beam 272 is passed through a second lens 222. The second lens 222 is disposed on the second light path 232. The second lens 222 forms a second beam diameter 269 from the second beam. The second beam diameter 269 may be about equal to the first beam diameter 206.

At operation 407, the second beam 272 is passed through a first aperture 260. The first aperture 260 is disposed on the second light path 232. The first aperture 260 receives the second beam 272. In some embodiments the second beam 272 passes through the first aperture 260 when the second beam 272 reaches a second beam diameter 269 from the second lens 222. In other embodiments, the second beam 272 reaches the first aperture 260 before the second beam 272 reaches the second beam diameter 269. In one or more embodiments, the first aperture 260 is perpendicular to the second beam 272. In other embodiments, the first aperture 260 is the titled aperture 263. The titled aperture 263 is angled at a tilt angle 266 from the second beam 272.

At operation 409, the second beam 272 is passed through a third lens 223. The third lens 223 is on the second light path 232. The third lens 223 is disposed after the first aperture 260 on the second light path 232. The third lens 223 receives the focused second beam 272 from the first aperture 260 and collimates the second beam 272.

At operation 411, a first image is formed from the second beam 272 by at least the first detector 208. In one or more embodiments, the first image is formed by one or more of the first detector 208, second detector 218, the sensor 308, and the controller 130. The first detector 208 receives the collimated light from the third lens 223. The first image includes information about the gratings 107. The first image provides at least one or more of a grating pitch P, a grating orientation, and a grating depth.

In some embodiments, the first image is also formed using one or more of the second detector 218, third detector 217, sensor 308, and the controller 130. The first image is capable of providing information about the gratings 107. The information includes one or more of grating pitch P, grating orientation, reflectivity strength of the gratings, and grating depth.

Benefits of the present disclosure include enhanced resolution of the gratings. The first lens focusing light to a much smaller point enables localized grating analysis. Passing focused light through the first aperture helps to minimize noise caused by light reflected from other surfaces.

It is contemplated that one or more aspects disclosed herein may be combined. As an example, one or more aspects, features, components, operations and/or properties of the optical arm 104, first lens 221, second lens 222, third lens 223, first aperture 260, titled aperture 263, first detector 208, second detector 218, and third detector 217, shown in FIGS. 2A-2D, the detector arm 112, first lens 327 second lens 328, third lens 329, second aperture 360, and sensor 308 shown in FIG. 3, and/or the method 400 in FIG. 4, maybe be combined. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. A system, comprising:
a substrate support; and
an optical arm, the optical arm is angled relative to a surface of the substrate support, the optical arm comprising:
    a light source disposed in the optical arm, the light source operable to project a first beam on a first light path;
    a first lens disposed on the first light path and between the substrate support and the light source, the first lens operable to focus the first beam to a first beam diameter;
    a first beam splitter disposed on the first light path, the first beam splitter positioned on the first light path between the substrate support and the light source, the first beam splitter operable to allow the first beam projected on the first light path to the substrate support and operable to reflect a second beam on a second light path;
    a first detector disposed in the optical arm and on the second light path;
    a second lens operable to focus the second beam to a second beam diameter; and
    an aperture disposed on the second light path between the second lens and the first detector.

2. The system of claim 1, further comprising a controller in communication with the first detector, the controller configured to measure a grating attribute based on information received from at least the second light path.

3. The system of claim 1, wherein the first lens is between the first beam splitter and the light source on the first light path.

4. The system of claim 1, wherein the first beam splitter is between the first lens and the light source on the first light path.

5. The system of claim 1, wherein the aperture is disposed at a tilt angle from the second light path.

6. The system of claim 5, wherein the first detector is disposed at the tilt angle.

7. The system of claim 1, further comprising a second detector disposed on a third light path reflected from the first beam splitter before the first beam passes through the first beam splitter.

8. The system of claim 1, wherein the second lens is between the aperture and the first beam splitter on the second light path.

9. The system of claim 8, further comprising a third lens between the aperture and the first detector on the second light path.

10. The system of claim 1, further comprising a reticle between the light source and the first beam splitter.

11. The system of claim 1, further comprising a third detector disposed at an angle from the second beam.

12. The system of claim 11, further comprising a second beam splitter after the aperture on the second light path, the second beam splitter disposed before the first detector and the third detector.

13. A system, comprising:
a substrate support;
an optical arm, the optical arm is angled relative to a surface of the substrate support, the optical arm includes an arm actuator configured to rotate the optical arm about a z-axis corresponding to a center of the substrate support, the optical arm having:
    a light source, the light source operable to project a first beam on a first light path;
    a first plurality of lenses having a first lens, the first lens on the first light path and disposed between the substrate support and the light source, the first lens operable to focus the first beam to a beam diameter;
    a first beam splitter disposed on the first light path, the first beam splitter positioned on the first light path between the substrate support and the light source, the first beam splitter operable to allow the first beam projected on the first light path to the substrate support and operable to reflect a second beam on a second light path;
    a first detector disposed on the second light path;
    a second lens of first plurality of lenses the second lens operable to focus the second beam to a second beam diameter
    a first aperture disposed on the second light path between the second lens and the first detector, the first aperture operable to receive the second beam diameter of the second beam from the second lens; and
a detector arm comprising:
    a second plurality of lenses having a first lens and a second lens;
    a second aperture disposed between the first lens and second lens of the second plurality of lenses the second aperture disposed on a reflected light path; and
    a sensor on the reflected light path.

14. The system of claim 13, wherein the first aperture is disposed at a tilt angle from the second beam.

15. A system, comprising:
a substrate support;
an optical arm having:
    a light source, the light source operable to project a first beam on a first light path;
    a first plurality of lenses having a first lens, the first lens on the first light path and disposed between the substrate support and the light source, the first lens operable to focus the first beam to a beam diameter;

a first beam splitter disposed on the first light path, the first beam splitter positioned on the first light path between the substrate support and the light source, the first beam splitter operable to allow the first beam projected on the first light path to the substrate support and operable to reflect a second beam on a second light path;

a first detector disposed on the second light path;

a second lens of first plurality of lenses the second lens operable to focus the second beam to a second beam diameter;

a first aperture disposed on the second light path between the second lens and the first detector, the first aperture operable to receive the second beam diameter of the second beam from the second lens, wherein the first aperture is disposed at a tilt angle from the second beam; and a detector arm comprising:

a second plurality of lenses having a first lens and a second lens;

a second aperture disposed between the first lens and second lens of the second plurality of lenses the second aperture disposed on a reflected light path, wherein the second aperture is disposed at the tilt angle from the second beam; and a sensor on the reflected light path.

16. The system of claim 13, further comprising a second lens of the first plurality of lenses, the second lens disposed between the first aperture and the first beam splitter on the second beam.

17. The system of claim 13, wherein, the substrate support is disposed between the optical arm and the detector arm.

18. A method, comprising:

rotating a substrate having at least one optical device with a plurality of gratings to position at least one optical device structure of a respective grating having an orientation angle perpendicular to a first light path directed to a first zone of the substrate, the first zone having the plurality of gratings disposed therein;

projecting a first beam at the first zone, the first beam on the first light path passing through a first lens to form a first beam diameter of the first beam at a first grating of the plurality of gratings of the at least one optical device;

reflecting the first beam from the first grating to form a second beam on a second light path;

passing the second beam through a second lens disposed on the second light path, the second lens forming a second beam diameter;

passing the second beam through a first aperture disposed on the second light path, the first aperture receiving the second beam diameter of the second beam;

passing the second beam through a third lens on the second light path, the third lens disposed after the first aperture; and forming a first image from second beam with a first detector to determine at least one of the orientation angle or a pitch of the at least one optical device structure of the respective grating.

19. The method of claim 18, wherein the first beam diameter of the first lens is directed to an angled face of the first grating.

20. The method of claim 18, wherein the first beam diameter of the first lens is directed to a top face of the first grating.

21. The system of claim 1, wherein the optical arm includes an arm actuator configured to rotate the optical arm about a z-axis corresponding to a center of the substrate support.

* * * * *